Feb. 24, 1925.

D. H. BELLAMORE

DISK WHEEL

Filed Sept. 4, 1920    2 Sheets-Sheet 1

1,527,506

INVENTOR
David. H. Bellamore
BY Jas. H. Griffin
ATTORNEYS

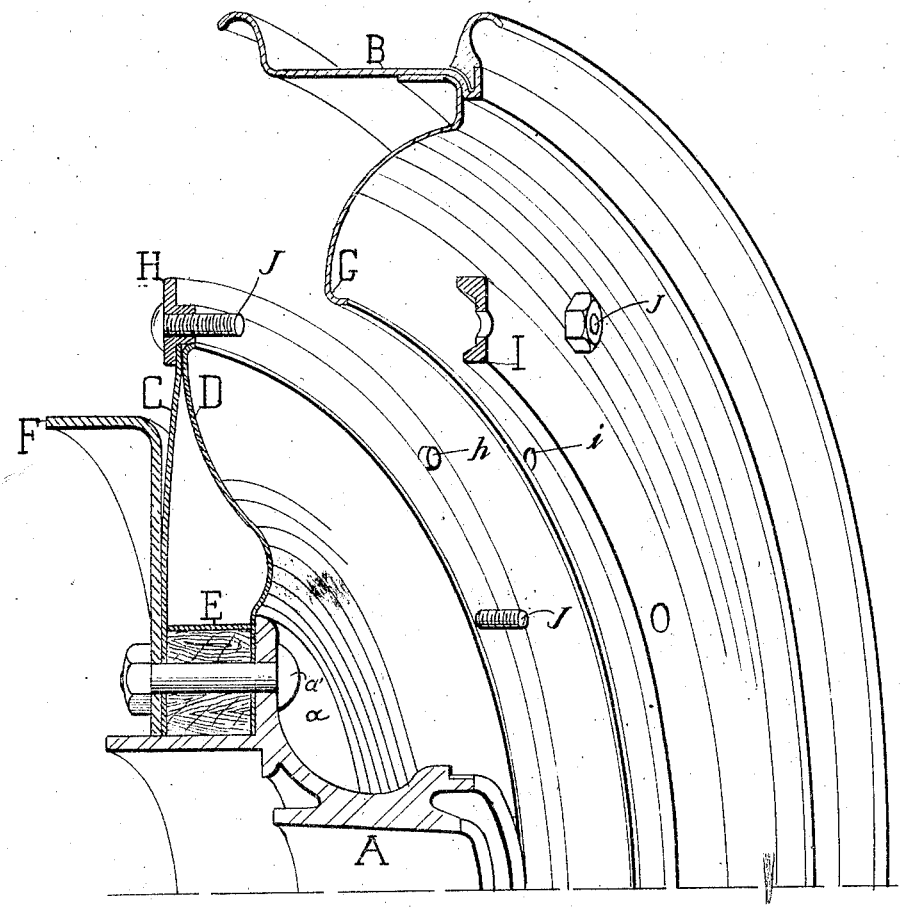
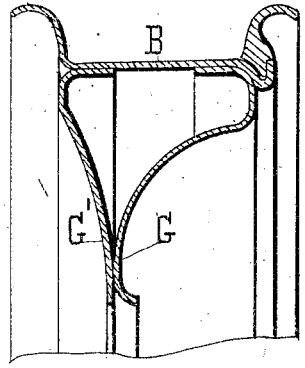

Patented Feb. 24, 1925.

1,527,506

UNITED STATES PATENT OFFICE.

DAVID H. BELLAMORE, OF NEW YORK, N. Y.

DISK WHEEL.

Application filed September 4, 1920. Serial No. 408,250.

*To all whom it may concern:*

Be it known that I, DAVID H. BELLAMORE, a subject of the King of Great Britain, residing in the city of New York, borough of Manhattan, county and State of New York, have invented a certain new and useful Disk Wheel, of which the following is a specification.

This invention relates to disk wheels and is aimed, more particularly, to provide a highly efficient, strong, durable and relatively light construction, possessing all the advantages of both demountable wheels and wheels that have demountable rims, although free from the disadvantage inherent to both of these types.

As disk wheels are now generally constructed, they are of two distinct types, namely, those wherein the wheel is adapted to be removed from the vehicle when it is desired to change a tire on the road and those wherein the wheel remains upon the vehicle and the tire is mounted upon a demountable rim, which may be positioned on or removed from the wheel, in the event of puncture or blow-out.

Demountable wheels are very satisfactory in use, but occasion considerable labor in changing and, accordingly, the demountable rim is most preferred, because of easier and less laborious task required for the changing of a tire on the road and, furthermore, because of the fact that it is less expensive and more economical to carry an extra demountable rim than an extra wheel or two.

Aside from the question of expense and labor, however, both the demountable wheel and demountable rim types have further disadvantages well-known to the motorist. For example, a demountable rim is maintained in position upon the felly of the wheel usually by means of bolts or clamps which become caked with mud and rusted to position, so that if a tire is not changed for several months, it becomes extremely difficult to make the change when the occasion requires, and even though this change may be made, it is a very dirty and laborious task to pry off of a wheel a demountable rim which has become rusted in the place and which is caked and covered with mud.

With these considerations in mind, it is the prime object of the present invention to provide a wheel which not only possesses the characteristics hereinbefore enumerated but one which may be readily changed on the road without necessitating the prying off of a demountable rim or the removal of the wheel itself. The present invention, figuratively speaking, may be classified between a demountable wheel and a demountable rim since, while it is truly neither, it accomplishes the functions of both.

In the preferred practical manner of carrying out the present invention, the rim of the wheel is spaced from the hub by one or more disks, which disks are divided into inner and outer sections which are demountably associated with one another, so that the outer disk section or sections may be removed from the inner disk section or sections, for the purpose of permitting the rim and outer disk section or sections to be demounted or removed from the inner disk section or sections. The advantages of such construction are many, and it will be apparent that, aside from those hereinbefore enumerated, such a construction not only decreases the weight at the circumference of the wheel through the elimination of a felly or a felly band and its securing adjuncts, but also results in a general reduction of the weight of the wheel throughout. Furthermore, when it is desired to demount a tire on the road, the mechanical devices which normally maintain the parts in an assembled relation are so removed from the tire that they are not apt to be caked with dirt or mud, nor so apt to be rusted in place, as in the case with demountable rims. Accordingly, the change may be effected more readily, with less labor and more expeditiously than heretofore possible with demountable rims. Moreover as only the outer portion of the wheel is demountable much less labor is required to change a tire on the road than would be necessary for the substitution of an entire wheel.

Features of the invention, other than those specified, as well as the advantages thereof, will be apparent from the following specification and claims when read in conjunction with the accompanying drawings.

In the drawings, I have illustrated one practical embodiment of the invention, but I wish it understood that the showing therein made is for the purpose of illustration only and does not define the limits of the invention.

Figure 3 is a section perspective of the wheel showing the manner of demounting the demountable portion thereof.

Figure 4 shows a slightly modified form of wheel section.

Figure 1:
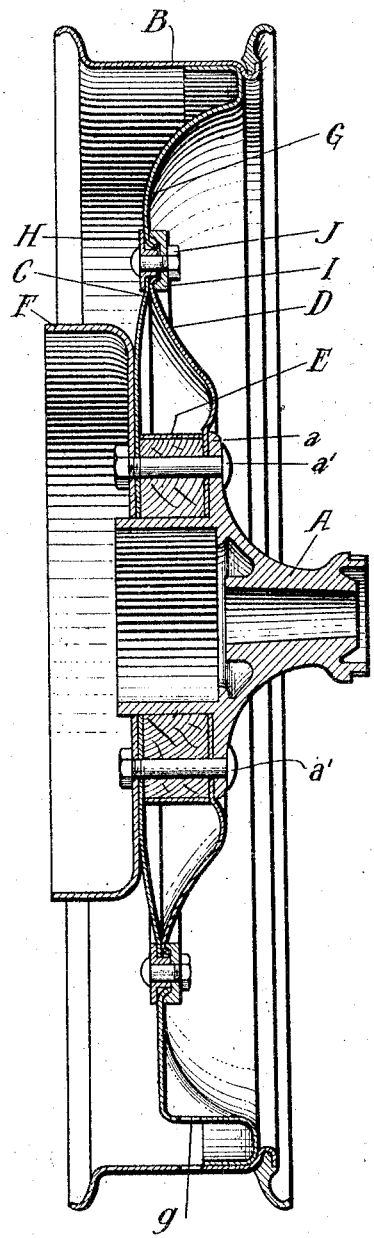
Figure 1 is a central section of a wheel constructed in accordance with this invention.

Referring to the drawings, A designates the hub of a wheel, and B the rim. The hub may be of any desired type and may be of the kind commonly employed on the well-known wooden wheels. In fact, the wheel of this invention is particularly adapted to be associated with the hub of a wooden wheel by merely removing the wooden spokes, felly, etc., from the hub and bolting the wheel of this invention in place upon the hub heretofore associated with the wooden wheel. The rim B may be of any well-known type or characteristic, but is preferably of the simple conventional form shown in the drawings.

The hub A is spaced from the rim B by means of one or more disks and, in accordance with the present invention, this disk or disks are divided into inner and outer sections, which are detachably associated with each other. In a specific form of wheel shown, the inner disk sections are two in number, designated in the drawings as C and D. The disks C and D are adapted to be bolted to the flange a of the hub, by means of the usual bolts a', and a spacer or filler E is positioned between the disks C and D directly adjacent the hub, so as to space them apart for the purpose of lending lateral strength to the construction. The spacing means E may be in the form of an annulus extending entirely around the hub or may consist of several small blocks through one of which each of the bolts a' passes, for the purpose of firmly securing both of the disks C and D to the hub.

For the purpose of illustration, a rear wheel is shown in Figure 1, and with such rear wheel is associated a brake drum F, which is adapted to be mounted on the wheel by the same bolts a' which secures the disks to the hub.

The disk C is preferably slightly dished in a lateral direction, while the disk D is preferably dished to a greater degree, so as to render the same a substantial bell shape, as shown, for the purpose of imparting slight radial resiliency to the construction, as well as sufficient lateral resiliency, to take up sudden lateral shocks or strains to obviate disruption or bending of the construction.

Both the disks C and D are the same diameter, which is of a diameter preferably appreciably less than the inner diameter of the rim B, and, in practice, the outer peripheries of said plates C and D are preferably welded together, either through a continuous weld or by spot welding, although they may be bolted or riveted together, or may, if desired, be left unattached to one another.

Figure 2:
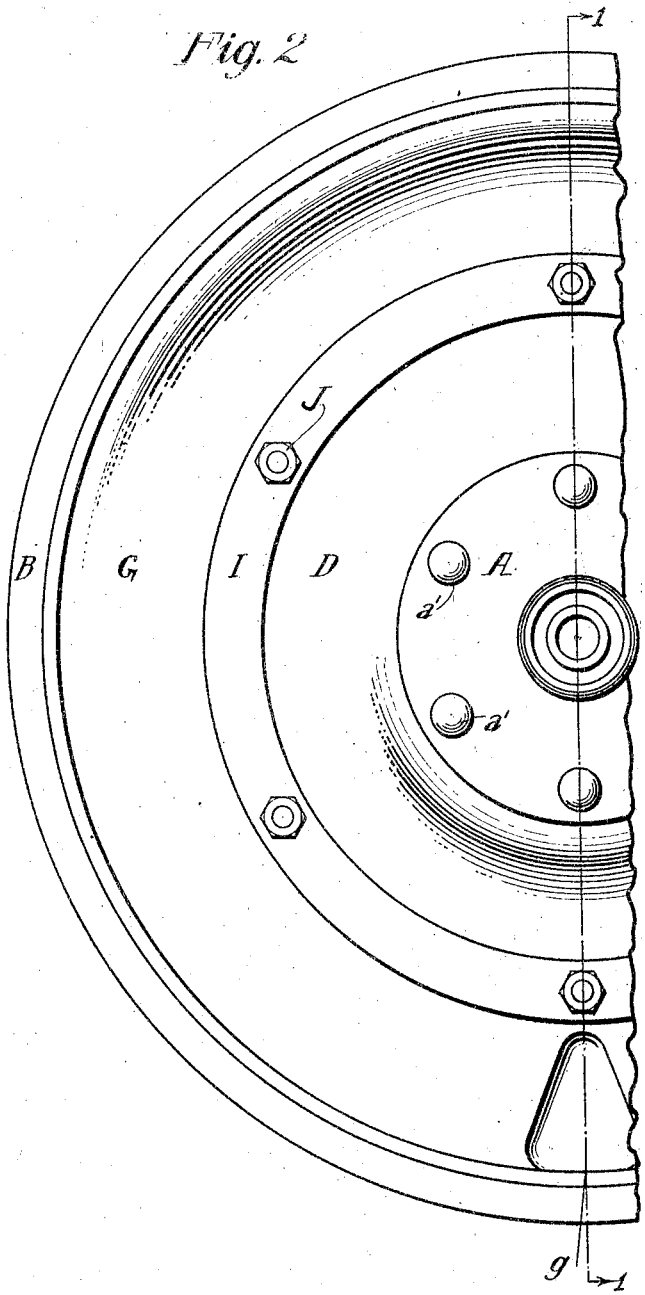
Figure 2 is a face view of the wheel shown in Figure 1.

The outer disk section or sections is shown in Figures 1, 2 and 3 of the drawings as one in number and is designated by the reference numeral G, while in Figure 4, two such sections are shown, the second section being designated G'. When either one of two sections as described is employed, it is secured to the rim B by welding, riveting, bolting or otherwise, so that the rim is permanently secured to such outer disk sections, and either or both of said sections are preferably dished, as shown, so as to bring their inner peripheries into substantially the same plane as the outer peripheries of the inner disk sections C and D. In practice, the single outer disk section D, as shown in Figures 1 to 3, I preferably employ on pleasure cars or light trucks, but for heavier duty, the construction of Figure 4 showing the extra section G' may be used. In either event, the rim B with the outer section or sections permanently secured thereto becomes a demountable element of the wheel, and means is provided whereby this element of the construction may be demountably associated with the remaining portion of the wheel comprising the inner disk sections C and D and in the hub A.

While the securing means referred to may partake of various forms for the accomplishment of the same end, a pair of clamping rings or annuli H and I may be conveniently and efficiently employed. The ring H is preferably permanently secured, although not necessarily so, to the outer margin of the disks C and D by welding, spot welding, bolts, screws, alike, while such ring is left free from permanent attachment to the outer disk section or sections. The ring I is normally without attachment to either of the sections, but may be secured to the ring H, and in clamping relation thereto by means of a plurality of bolts J which pass through both rings at spaced intervals throughout their extent, as shown in Figures 1 and 2. The function of the rings H and I is to collectively form an annular clamp between which both the inner and outer disk sections may be clamped after the manner shown in Figure 1, for the purpose of removably associating the demountable portion of the wheel with the relatively permanent portion thereof.

With the construction specified, it will be apparent that in the event of a puncture or blow-out on the road, the rim of the wheel, together with the outer section or sections, may be demounted as a unit, by simply removing the nuts of the bolts J whereupon the ring I may be withdrawn after the manner shown in Figure 3, and whereupon the demountable section of the wheel may be removed, as also clearly shown in such illustration. This having been accomplished, another demountable section with an inflated tire in position thereon may be readily and speedily positioned on the permanent portion of the wheel and secured in place through the return of the ring I to its clamping position, and the application of the nuts of the bolts J.

It will be manifest from the foregoing detailed description of the preferred form of the invention that the present wheel embodies many features of advantage over those heretofore employed. The use of a demountable disk section permanently associated with the rim, so as to be demountable as a unit therewith, has many practical advantages. In the first place, it economizes in the cost of manufacture, for the reason that it obviates the necessity of providing a felly or felly band, in order to obtain demountable characteristics. Moreover, the respective disk sections being of lesser dimensions as to area may be formed economically and with less liability to fracture than the larger or more expensive disks of the prior constructions. By eliminating the felly, the weight of the wheel at the rim thereof is, accordingly, materially reduced, thereby minimizing gyroscopic disadvantages of wheels which are heavily weighted at their rims.

The use of the construction, which may be adapted to the hubs of the wooden wheels, is also of marked practical advantage, since it enables a car owner having a car with wooden wheels to readily change to the disk wheel with minimum expense through the use of the original hubs, whereas if new hubs were required, additional expense would be entailed and a proper fit with the axles and bearings would at times be difficult.

The demounting of the tire on the road is much simpler with the present invention than with either of the demountable rim or demountable wheel, since it is only necessary to remove the nuts of the attaching bolts and the bearing between the clamping parts is such that sticking will not be encountered in the demounting of the parts, nor will the exertion of great power be required to position the new demountable section in place. Furthermore, the operator will work on a portion of the wheel which is not so apt to accumulate mud, and the job will be cleaner and less distasteful.

In practice, I find that the employment of cooperating clamping rings H and I give very good results, although, if desired this ring may be circumferentially broken up into sections, so as to form relatively short clips at each bolt J, without departing from the spirit of this invention.

In order that proper driving connection may be had between the inner and outer disk sections, I preferably provide the ring H with short lugs extending in a lateral direction, and form in the ring I juxtaposed holes $i$, so that when the outer disk section is brought into position the pins or lugs $h$ will enter the holes $i$ and lock the sections together against circumferential movement relative to one another, so that the driving of the wheel is not depending entirely upon friction. These lugs, however, may be omitted, is desired.

Another feature of advantage inherent in the present wheel is the fact that I preferably form a recess in one of the outer disk sections $g$, during the stamping thereof, and so shape this recess G that the tire nipple may project thereinto, after the manner shown in dotted lines in Figure 2, thereby enabling the tire to be readily inflated from the outer face of the wheel. In practically all disk wheels, the inflating of the tire must be accomplished from the inner face of the wheel, which renders the same very inconvenient and difficult to carry out.

Many advantages other than those specifically referred to will be apparent to those skilled in the art from a reading of the foregoing specification, but it may be here further noted that when the outer wheel section is removed, the brake drum and band of the rear wheels are readily accessible for repair or adjustment without necessitating the actual removal of the brake band or drum. Manifestly, this feature of accessibility has many pronounced advantages not inherent in prior constructions.

In the manufacture of wheels of the character specified, it is entirely practical to use stock rims, thereby minimizing the costs of manufacture over and above the obvious saving due to the complete absence of a felly section.

The wheel of the present invention, as will be manifest from the foregoing description, embodies many features of novelty, which, when combined in a wheel, result in a structure of pronounced utility, efficiency and economy.

It will be understood, however, that some of the features described may be used in wheel construction without necessarily employing them all. Moreover, equivalents may be substituted without departing from the spirit or scope of the invention. Accordingly, the present invention is to be understood as not restricted to the specific details, but is to be construed as broadly novel as is commensurate with the appended claims.

What I claim is:

1. A disk wheel, embodying a rim, a hub, a disk for spacing the hub from the rim, said disk being divided intermediate the hub and rim into inner and outer sections, and means for demountably securing the outer section to the inner section with their contiguous edges in substantially the same plane.

2. A disk wheel, embodying a hub, a rim, disk sections for spacing the hub from the rim, said disk sections being separable intermediate the hub and rim, whereby the rim and adjacent disk section is demountable relative to the hub and its adjacent disk section, the inner disk section embodying a pair of disks dished in opposite directions and spaced apart at the hub.

3. A disk wheel, embodying a hub, at least one disk mounted on the hub, a rim, at least one annular disk permanently associated with the rim and having an inner diameter greater than the outer diameter of the hub disk, and means for demountably securing the inner periphery of the annular disk to the outer periphery of the hub disk.

4. A disk wheel, embodying a hub, at least one disk section mounted on the hub, a rim, at least one annular disk section permanently associated with the rim, and annular clamping means engaging with the inner and outer faces of both disks for demountably securing the inner periphery of the annular disk section to the outer periphery of the disk section mounted on the hub.

5. A disk wheel embodying a hub, a rim, at least one outer disk section permanently secured to the rim, at least one inner disk section associated with the hub, a pair of clamping rings for clamping the inner periphery of the outer disk section to the outer periphery of the inner disk section, and means for clamping said rings tightly together.

6. In a disk wheel, a hub, a rim, a pair of disks secured to the hub and of a radius less than the distance from the hub to the rim, said disks being dished in opposite directions, and of substantially the same radius, and being secured together at their outer peripheries and spaced apart adjacent the hub, in combination with at least one disk of annular configuration secured at its outer periphery to the rim, and means for securing the inner periphery of the annular disk to the outer peripheries of the dished disks.

7. In a disk wheel, a rim, a hub, a pair of oppositely dished disks of substantially the same diameter spaced apart adjacent the hub and secured to said hub, and having their outer peripheries abutting one another, said disks being of less diameter than the interior diameter of the rim, an annular disk secured at its outer periphery to the rim, and means for securing the inner periphery of the annular disk to the outer peripheries of the dished disks.

8. In a disk wheel, a rim, a hub, a pair of disks of less diameter than the interior diameter of the rim, which disks are dished in opposite directions and are secured to the hub in spaced relation to one another at the hub and in face abutting relation adjacent their outer peripheries, an annular disk section secured to the rim and of greater interior diameter than the diameter of the dished disks, and means interfitting between the outer peripheries of the dished disks and the inner periphery of the annular disk and embodying means for clamping the annular disk to the dished disks.

9. In a disk wheel, a rim, a hub, a pair of disks of less diameter than the interior diameter of the rim, which disks are dished in opposite directions and are secured to the hub in spaced relation to one another at the hub and in face abutting relation adjacent their outer peripheries, an annular disk section secured to the rim and of greater interior diameter than the diameter of the dished disks, and means interfitting between the outer peripheries of the dished disks and the inner periphery of the annular disk and embodying means for clamping the annular disk to the dished disks, said means also comprising driving lugs adapted to engage apertures in the annular disk.

10. In a disk wheel, a rim, a hub, a disk secured to the hub, an annular disk secured to the rim, a pair of clamping rings for clamping the inner periphery of the outer disk to the outer periphery of the inner disk, means for clamping said rings tightly together, and cooperating driving lugs and apertures for precluding relative rotation between the parts.

In testimony whereof, I have signed my name to this specification.

DAVID H. BELLAMORE.